United States Patent
Haberek

(10) Patent No.: US 8,072,779 B1
(45) Date of Patent: Dec. 6, 2011

(54) RECESSED ELECTRICAL DEVICE HOUSING ASSEMBLY AND CLIP

(75) Inventor: Andrew M. Haberek, Baldwinsville, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 515 days.

(21) Appl. No.: 12/349,673

(22) Filed: Jan. 7, 2009

(51) Int. Cl.
*H02B 1/01* (2006.01)

(52) U.S. Cl. .......................................... 361/825; 439/535

(58) Field of Classification Search ................... 361/825; 174/17 R, 35 GC, 43, 40 CC, 63
See application file for complete search history.

(56) References Cited

U.S. PATENT DOCUMENTS

| | | | | |
|---|---|---|---|---|
| 3,418,420 | A * | 12/1968 | Zerwes | 174/53 |
| 4,613,729 | A | 9/1986 | Daisenberger | |
| 4,758,687 | A | 7/1988 | Lathrop | |
| 5,135,411 | A * | 8/1992 | Wiley et al. | 439/535 |
| 5,289,934 | A | 3/1994 | Smith | |
| 5,419,716 | A | 5/1995 | Sciammarella | |
| 5,526,952 | A * | 6/1996 | Green | 220/3.8 |
| 5,621,788 | A | 4/1997 | Eiken | |
| 5,961,345 | A * | 10/1999 | Finn et al. | 439/536 |
| 6,207,895 | B1 | 3/2001 | Engel | |
| 6,229,087 | B1 | 5/2001 | Archer | |
| 6,403,883 | B1 * | 6/2002 | Morgan et al. | 174/58 |
| 6,793,524 | B2 * | 9/2004 | Clark et al. | 439/536 |
| 6,875,937 | B1 | 4/2005 | Saviano | |
| 7,141,736 | B2 | 11/2006 | Plankell | |
| 7,468,486 | B2 * | 12/2008 | Yan | 174/58 |
| 7,618,284 | B2 * | 11/2009 | Lamoureux et al. | 439/535 |
| 7,622,676 | B2 * | 11/2009 | Drane et al. | 174/66 |
| 7,757,875 | B2 * | 7/2010 | Lalancette et al. | 220/4.02 |
| 7,771,230 | B2 * | 8/2010 | Hammond et al. | 439/541.5 |
| 2007/0279887 | A1 * | 12/2007 | Sullivan et al. | 361/809 |
| 2008/0196921 | A1 * | 8/2008 | Dinh | 174/58 |
| 2008/0207047 | A1 * | 8/2008 | Walton | 439/538 |
| 2010/0000756 | A1 * | 1/2010 | Peck | 174/51 |

OTHER PUBLICATIONS

Recessed Electrical Designs—RED™; T.A. Saviano Design; www.recessedelectricaldesigns.com/index.cfm/home.htm; Nov. 15, 2006; info@recessedelectricaldesigns.com; P.O. Box 530, Pescardero, CA 94060; pp. 1-2; Copyright 2006. Product Bulletin for the R.E.B. Recessed Entertainment Box; Leviton; 'Introducing Leviton's Exclusive New R.E.B. Recessed Entertainment Box—Think "Inside the Box"'.
Carlon® Recessed Dual Voltage 3-Gang Old Work Plate Advertisement.

* cited by examiner

*Primary Examiner* — Lisa Lea Edmonds
*Assistant Examiner* — Xanthia C Cunningham
(74) *Attorney, Agent, or Firm* — Daniel P. Malley; Bond Schoeneck & King

(57) ABSTRACT

A removable, uni-body, low voltage device adapter clip for an electrical device housing having an opening that is sized to accommodate a standard N-gang outlet box, makes it possible to mount a low voltage device in the sized-opening. The clip includes a longitudinal body portion having opposite ends defining an N-gang length there between. The clip has a finger structure that is configured to engage a front and a rear surface of an edge of the sized opening. It further has N device mounting bores disposed between the opposite ends, each of which is aligned with a longitudinal centerline of each one of the N-gang-sized openings. An electrical device housing assembly includes an electrical device housing having a plurality of recessed walls, wherein at least one of the walls has an opening that is sized to accommodate a standard N-gang outlet box, and a pair of removable, uni-body, low voltage device adapter clips. The assembly may include a low voltage device. The assembly may further include integrated mounting flanges and flange covers.

32 Claims, 13 Drawing Sheets

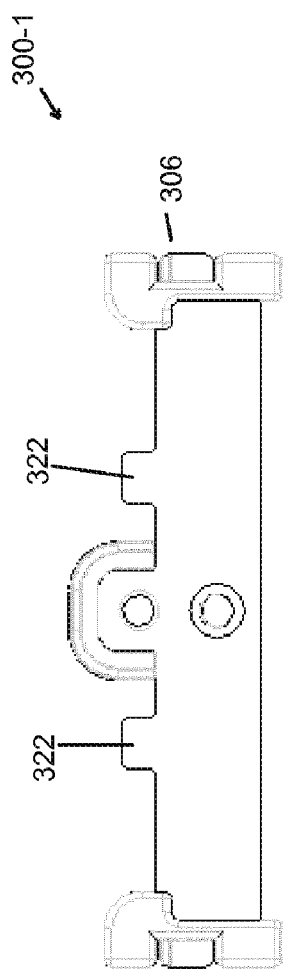
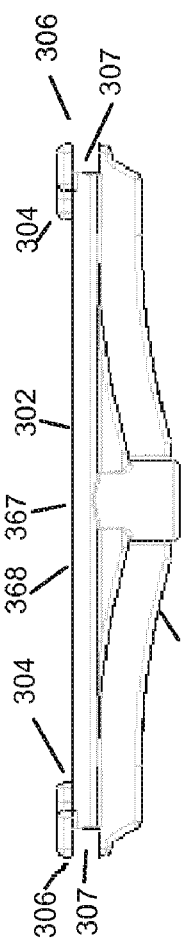
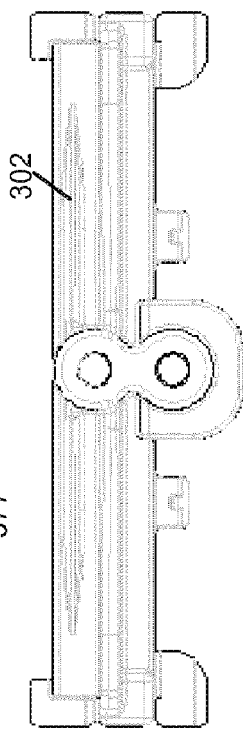
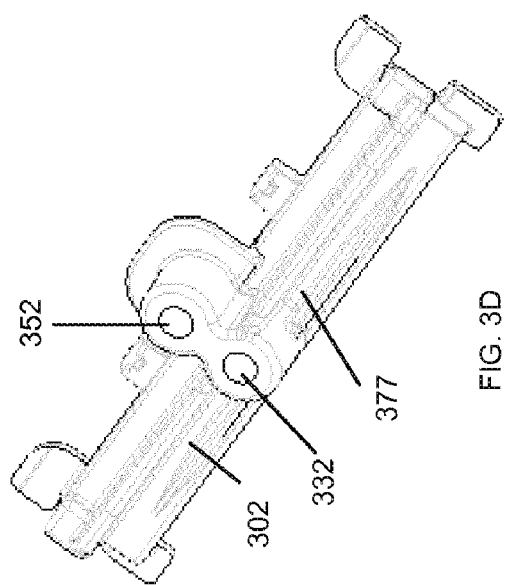
FIG. 3A
FIG. 3B
FIG. 3C
FIG. 3D

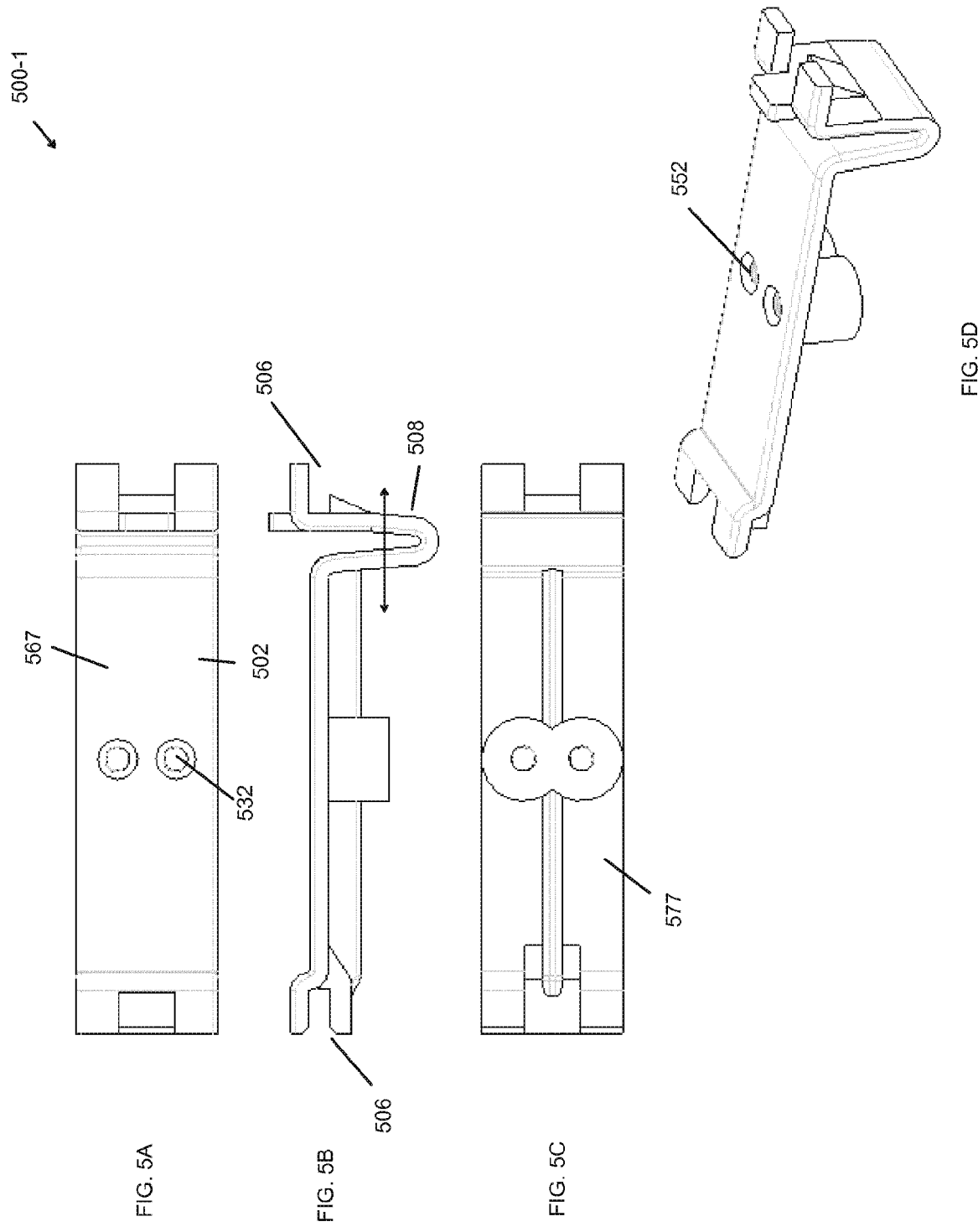

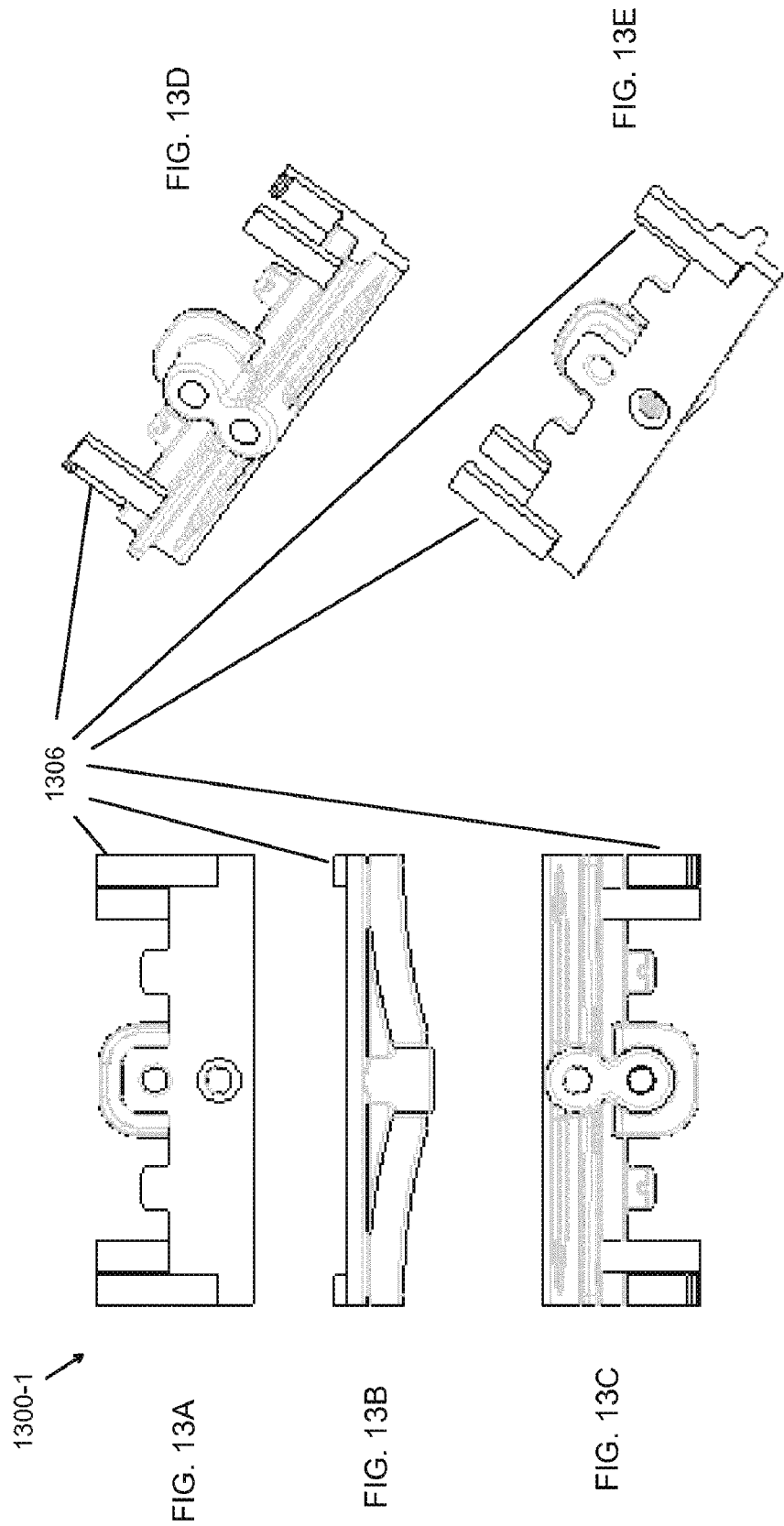

RECESSED ELECTRICAL DEVICE HOUSING ASSEMBLY AND CLIP

RELATED APPLICATION DATA

N/A.

FIELD OF THE INVENTION

Embodiments of the invention generally relate to electrical device assemblies and components. More particularly, an embodiment of the invention is directed to a removable adapter clip for mounting a low voltage device in an electrical device housing assembly designed to accommodate a wiring device. Another embodiment is directed to a housing assembly for electrical wiring devices that interchangeably accommodates both low voltage devices and electrical wiring devices.

BACKGROUND OF THE INVENTION

As used herein, the term "low voltage device" is meant to include, but is not limited to, coaxial sockets, telephone sockets, data sockets, RCA ports, HDMI ports, S-Video ports, low voltage ports, DC voltage ports, etc., as a person skilled in the art would understand to be low voltage devices.

As used herein, the term "wiring device" is meant to include, typically single-gang, 120 V or 240 V receptacles, fixture ON/OFF switches, ground fault circuit interrupters (GFCIs), surge protective devices (SPDs), transient voltage suppressors (TVSSs), arc fault circuit interrupters (AFCIs), proximity sensors, dimmers, decorator style devices, duplex devices, combinations thereof, etc. Wiring devices are typically used in institutional and residential wiring distribution systems for providing power to a load. They are required by the electrical code to be mounted in outlet boxes having predefined outlet box opening sizes. The family of sizes are referred to as "gangs", the smallest opening being a single gang opening.

As used herein, the term "TV wall box" or "recessed TV wall box", expressed as a unit or an assembly, refers to an electrical device housing structure that mounts in a wall and, which, provides a recessed space and dedicated openings for either wiring devices or low voltage devices, while providing a flush mounting on the wall. Accordingly, a flat screen TV, for example, could be hung on the wall without any structural interference with the TV wall box. It is to be further noted that TV wall boxes as well as the wall box assembly according to embodiments of the instant invention are not to be construed as limited to use with televisions, monitors, or the like; rather, there are various utilities adapted to a flush mounted wall box assembly as a person skilled in the art would appreciate. One non-limiting example would be behind a cabinet.

Known TV wall boxes are provided with dedicated openings for either wiring devices or low voltage devices. The openings are all essentially rectangular. The top and bottom wall surfaces surrounding the opening typically include a set of integrally molded bosses having bored holes, which are provided for mounting a low voltage device. The bosses intrude into the rectangular opening and although they accommodate the attachment of the low voltage device, this intrusion prevents the insertion of an outlet box. Conversely, the opening for a wiring device box typically has smooth perimeter edges that merely surround an outlet box otherwise affixed to a wall stud or attached to the wall. As a result, a wiring device cannot be installed at the "low voltage device locations" even if the low voltage device opening size would accommodate a wiring device. Since there are no bosses and no bored holes, a low voltage device cannot practically be installed at the "wiring device locations," unless, perhaps an adapter is provided to attach a low voltage device, as discussed further below.

Furthermore, since low voltage device mounting bosses/holes are integral to the TV wall box, these structures are necessarily formed during the TV wall box molding process. They have to be substantially parallel to the draw of the mold, i.e., normal to the mounting plane (established by mounting flanges) of the box. If the holes were not substantially parallel to the draw, very complex and expensive slides in the mold would be required. This restriction on hole orientation thus limits the quantity and the orientation of low voltage openings. These known boxes have to have at least one opening that is substantially parallel to the mounting flange of the TV wall box, otherwise low voltage device mounting holes cannot be molded into the box. Conversely, low voltage openings cannot be angled with respect to the mounting flange since mounting holes cannot be provided at such locations. If more than one low voltage opening is required, it must be placed in the plane parallel to the mounting flange. This considerably increases the width of the TV box.

Installers may face any number of consumer-desired wiring device and low voltage device combinations. The options currently available to the installer, however, are limited because of the dedicated nature of the openings as discussed above. One solution has been to commercialize a family of recessed TV wall box configurations. Whereas the family of boxes may address all foreseeable combinations, it is done so at considerable expense. Another solution has been to provide an over-sized TV wall box having more openings, but this adds difficulty to the installation. A further solution has been to let the installer "just take care of it", whereupon the installer may, e.g., install a pair of TV wall boxes that in combination provide the necessary openings. This solution is neither time- nor cost-efficient.

For certain commercially available TV wall boxes, the necessary installation hole in the sheetrock wall is sized by flipping the box around and hitting the box with a hammer, for example. The box thus makes indentations into the sheetrock. Unfortunately these marks are not always readily visible.

Known TV wall boxes opt for recessed side walls that enter the wall space at a steep angle. Since the openings in these walls are likewise at the steep angle, the boxes are necessarily very large in size to allow access to the outlet box and wiring device mounting screws. A smaller wall box would cause a screwdriver to misalign with respect to the mounting screw heads.

Other known TV wall boxes have a shallow-recessed, low voltage device opening, making these boxes unduly wide. They come as an assembly in which one housing nests inside the other. Unfortunately the wires may be routed between the two housings and become damaged as a result.

As mentioned above, an adapter may be provided to accommodate a low voltage device in an electrical device sized opening in a housing. FIG. 1 illustrates an exemplary adapter 100-1. The adapter has a rectangular shape that is sized to slide fit into an electrical device opening in a housing. The horizontal top and bottom sections of the adapter 100-1 have flanged surfaces that rest against outer wall surfaces surrounding the wall box opening in the housing and prevent the adapter from passing through the opening. The adapter 100-1 also includes a separate pair of screw-type mounting brackets 102 assembled in the flange sections as shown. The face of each bracket is drawn against the inner wall surface surrounding the electrical device opening upon tightening of the associated screw. A low voltage device can now be assembled to the adapter via the threaded bores 103 that are molded into the top and bottom sections of the adapter. The adapter has a number of disadvantages. These include its multi-component structure, its cost of manufacture, and the ability to remove it from the housing assembly while the low voltage device is assembled to the adapter. Another disadvantage is that a tool is required for fastening the adapter to the TV wall box, making the installation process more time-consuming.

In view of the foregoing and other reasons that will be recognized by those skilled in the art, the inventors have recognized a need for a convertible wiring device/low voltage device housing assembly and a low voltage device adapter that provide solutions and/or improvements over the currently available products and technology.

SUMMARY OF THE INVENTION

An embodiment of the invention is directed to a removable, uni-body, low voltage device adapter clip (hereinafter referred to as the 'clip') for an electrical device housing having an opening (hereinafter referred to as a 'sized-opening') that is sized to accommodate a standard N-gang outlet box. The clip disclosed herein makes it possible to mount a low voltage device (as referred to herein above) in the sized-opening. Such a sized-opening, as illustrated by example as single-gang opening 202 and double-gang opening 206 in FIG. 2, typically has smooth edges (i.e., no holes, bores, detents, protrusions, etc.) so that the sized-opening closely surrounds the perimeter of an installed electrical box. Sized-openings may also be encountered in box housing walls having various detents, protrusions, etc., immediately adjacent one or more edges of the sized-opening (not shown). Thus the clip can be designed to accommodate any variety of sized-opening features in commercially available housings, such that the clip may be considered to be a universally-adapted clip.

According to the embodied invention, the clip includes a longitudinal body portion having opposite ends defining an N-gang length there between. The clip has a finger structure that is configured to engage a front and a rear surface of an edge of the sized opening. It further has N device mounting bores disposed between the opposite ends, each of which is aligned with a longitudinal centerline of each one of the N-gang-sized openings. According to a non-limiting aspect, the finger structure is located at each opposite end and provides a sliding engagement of the clip with opposing edges of the sized-opening. In an alternative, non-limiting aspect, the finger structure may be located along an edge of the clip body allowing the clip to engage an upper or lower edge of the sized-opening. According to non-limiting aspects, the clip body may be rigid or, alternatively, have a compressible section that facilitates a snap-fit of the clip in the sized-opening.

Another embodiment of the invention is directed to an electrical device housing assembly. The assembly includes an electrical device housing having a plurality of recessed walls, wherein at least one of the walls has an opening that is sized to accommodate a standard N-gang outlet box, and a pair of removable, uni-body, low voltage device adapter clips. Each clip is characterized as described immediately above. According to a non-limiting aspect, the assembly further includes a low voltage device. When the finger structure of the clip is located at each opposite end, the pair of clips are removeably, slidingly engageable with the front and the rear surface of the opposing edges of the sized opening when the low voltage device is not fixedly assembled to the adapter clips; however, neither of the clips are dis-engageable with the front and the rear surface of the opposing edges of the sized opening when the low voltage device is fixedly assembled to the adapter clips.

Details, objects, features, and advantages of embodiments of the present invention will be apparent from the following detailed description of the preferred embodiments, which makes reference to several drawing figures.

BRIEF DESCRIPTION OF THE DRAWINGS

FIGS. 3(A-D) show, respectively, an upward-facing, front side elevational view; a top plan view; a downward-facing, rear-side elevational view; and a perspective view of a removable, uni-body, low voltage device adapter clip according to an embodiment of the invention;

FIGS. 5(A-D) show, respectively, an upward-facing, front side elevational view; a top plan view; a downward-facing, rear-side elevational view; and a perspective view of a removable, uni-body, low voltage device adapter clip according to another embodiment of the invention;

FIGS. 13(A-E) show, respectively, an upward-facing, front side elevational view; a top plan view; a downward-facing, rear-side elevational view; a rear-facing perspective view; and, a front-facing perspective view of a removable, uni-body, low voltage device adapter clip according to an embodiment of the invention.

DETAILED DESCRIPTION OF A PREFERRED EMBODIMENT OF THE INVENTION

Figure 1:
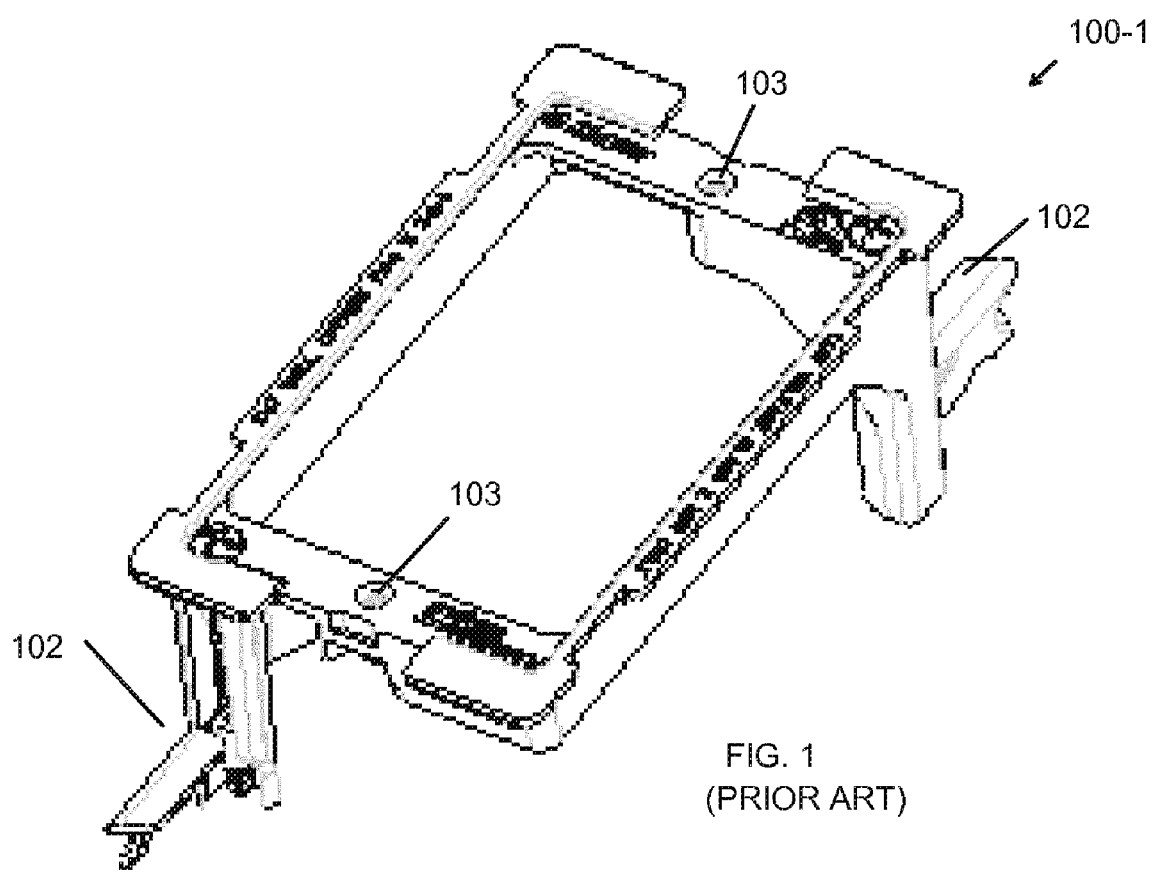
FIG. 1 is an illustration of an exemplary prior art low voltage device adapter.
Figure 2:
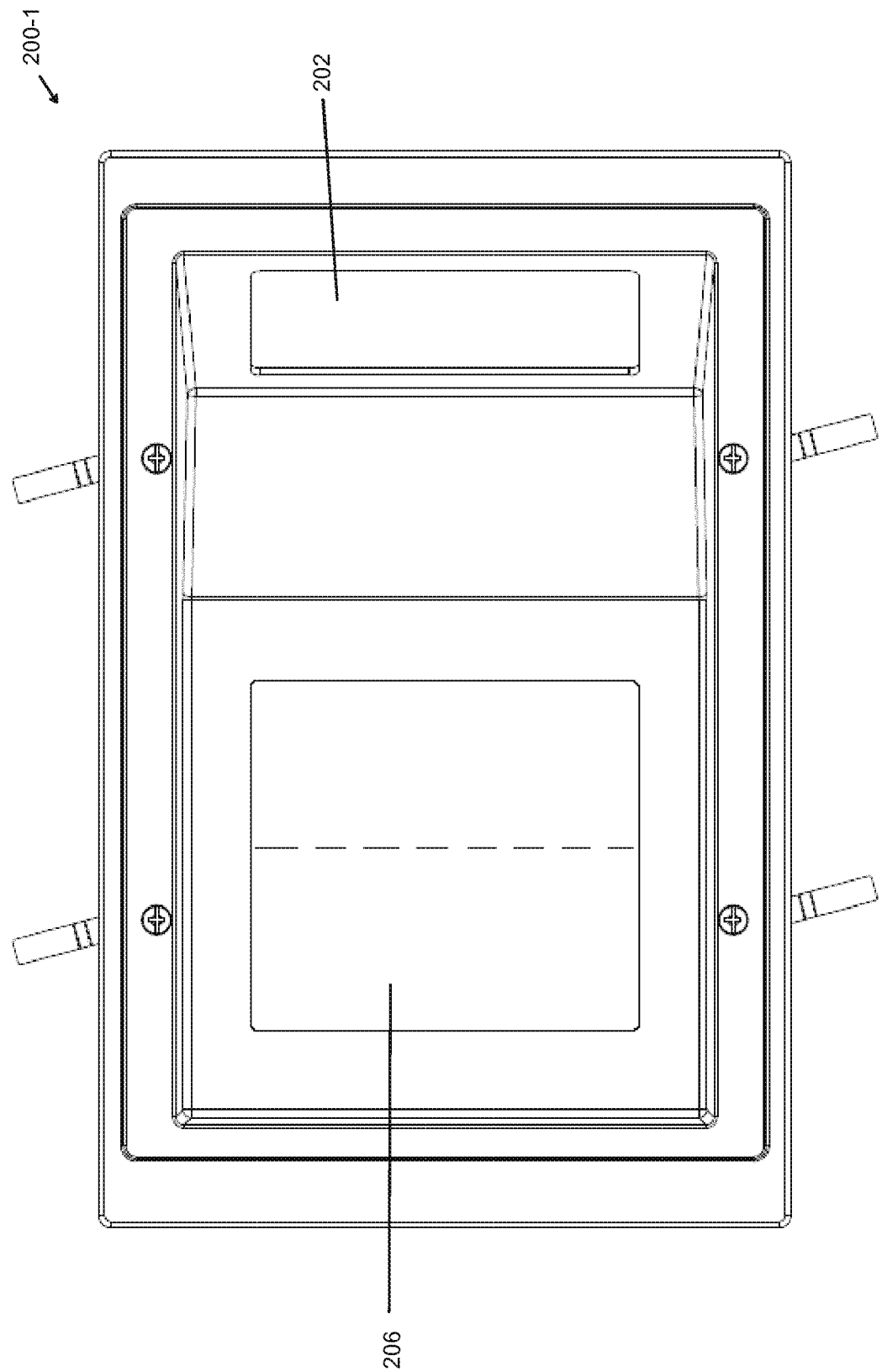
FIG. 2 is an illustration of an exemplary electrical device housing having a sized-opening.

FIGS. 3(A-D) show, respectively, an upward-facing, front side elevational view, a top plan view, a downward-facing, rear-side elevational view, and a perspective view of a removable, uni-body, low voltage device adapter clip 300-1 (hereinafter 'clip') according to an embodiment of the invention. The clip is intended to be used in an electrical device housing having an opening (hereinafter 'sized-opening') that is sized to accommodate a standard N-gang outlet box. As shown in the figures, the clip 300-1 has a longitudinal body portion 302 having opposite ends 304 that define a standard N-gang length there between. As shown in FIG. 3, N=1 such that the clip is adapted to occupy a standard single-gang-sized opening. According to a non-limiting aspect of the embodiment, the clip 300-1 has a finger structure 306 integrally disposed at each of the opposite ends 304. The finger structure as illustrated in FIG. 3 is configured to slidingly engage a front and a rear surface (403, 404) of an edge 405 of the sized opening 402 of an electrical device housing 400-1 as progressively illustrated in FIGS. 4(A-C). More particularly, the finger structure 306 provides a channel 307 that can accommodate the housing wall edge 405. The clip length is sized to the sized-opening 402 to ultimately seat the clip in the sized-opening as shown at 407. The clip can be installed by tilting the clip to align the finger channels with the housing walls (FIG. 4A), slidingly orienting it to a level position (FIG. 4B) and, finally, sliding the clip in the direction of the arrow (or turned upside down and slid in the opposite direction) to its final, installed position in the sized-opening as shown at 407. In the same manner, a second clip may be installed (FIG. 4C).

In a different non-limiting aspect as shown in FIGS. 13A-E, the finger structure 1306 of the clip 1300-1 may reside along the edge of the clip body that ultimately seats against the appropriate top or bottom wall edge of the sized-opening. In this case, the fingers would grip that surface rather than the surfaces in contact with the opposite end of the clip.

As illustrated in FIGS. 3 and 4, the body portion 302 of the clip includes a device housing protrusion 322 disposed between the opposite ends 304. The protrusion mates with a detent 422 in the final, installed position of the clip to further secure its placement. In another aspect, the device housing may include the protrusion and the clip body would include the engaging detent (not shown).

Figure 4C:
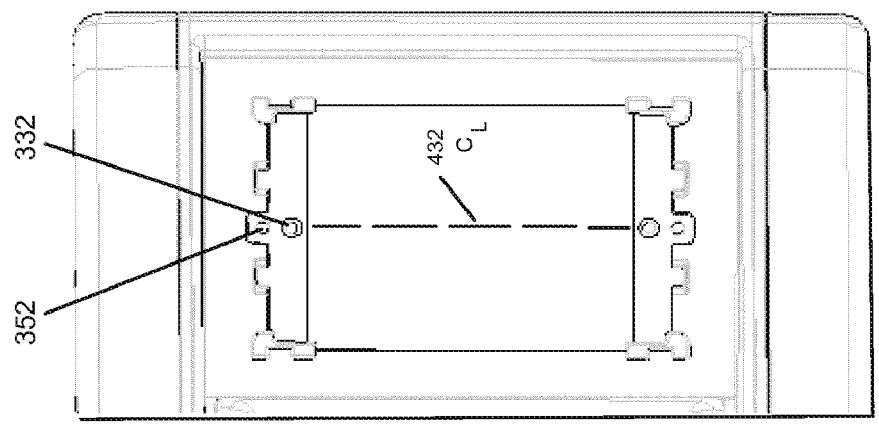
FIGS. 4(A-C) illustrate, respectively, the progressive installation of a clip in a sized-opening of an electrical device box according to an illustrative embodiment of the invention.
Figure 4B:
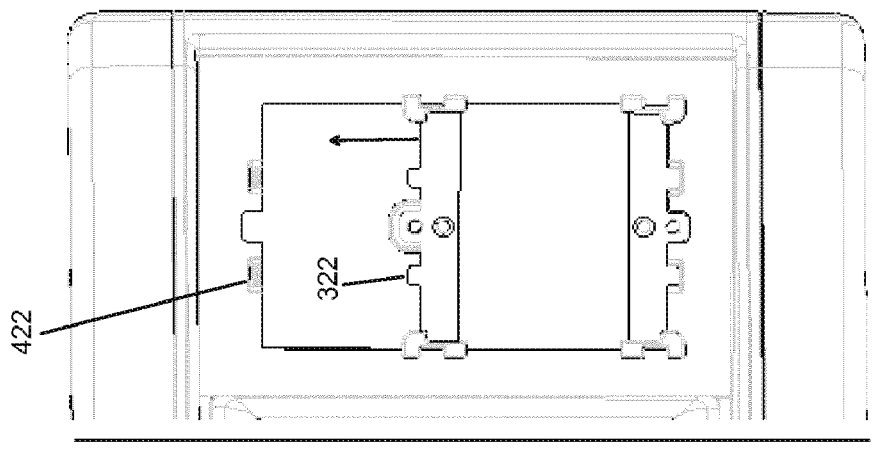
Figure 4A:
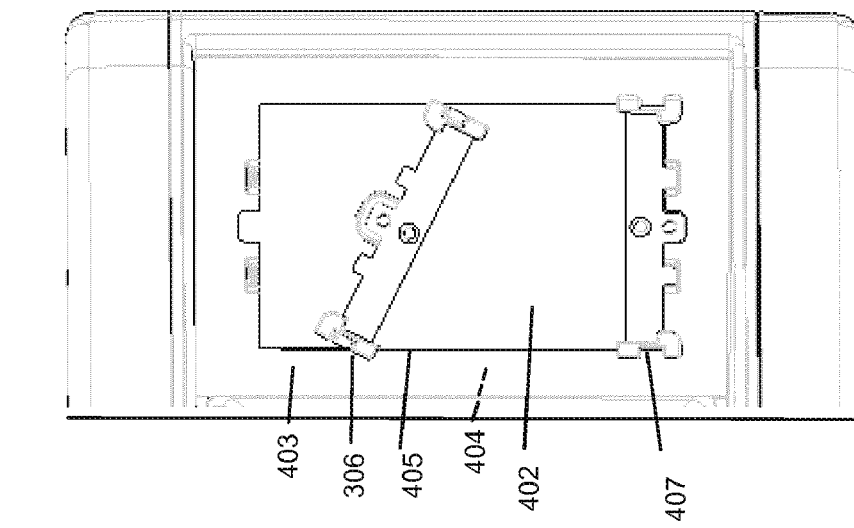

The clip further includes N device mounting bores 332 (N=1 as shown) disposed between the opposite ends, each of which is aligned with a longitudinal centerline (CL) 432 of each one of the N-gang-sized openings, as illustrated in FIGS. 3D and 4C. The device mounting bores may be threaded or, alternatively, may be smooth to accept a self-tapping low voltage device mounting screw.

In a further aspect, the clip 300-1 may include N faceplate mounting holes 352 (N=1 as shown), as shown in FIGS. 3 and 4. Alternatively, a U-shaped structure or no structure may be provided. Each faceplate mounting hole will be located adjacent to and vertically aligned with a respective device mounting bore.

As can be further seen particularly in FIGS. 3B, 3D, the clip has a front-facing (as installed) face 367 and a rear-facing face 377. At least a portion of the front-facing face immediately adjacent the device mounting bore will engage the mounting assembly of the low voltage device when assembled. Accordingly, the clip has a front face engagement surface 368 that is substantially flat and smooth. This also insures that no unnecessary structure is projecting into the user accessible space of the box assembly. The rear-facing face of the clip includes structural ribbing and the boss for the device mounting hole, which can protrude into the wall space behind the installed box assembly with little or no consequence.

FIGS. 5A-D illustrate another non-limiting embodiment of a clip 500-1. Clip 500-1 is similar to clip 300-1 except that, wherein the body of clip 300-1 is rigid, the body 502 of clip 500-1 includes an integral, resiliently, longitudinally-compressible section 508, thus allowing the clip to be snap-fit into the sized-opening and held in place by the actions of finger structures 506. The compressible section 508 need not be U-shaped as illustrated; rather any shape that allows sufficient compression and extension will be suitable.

Figure 6:
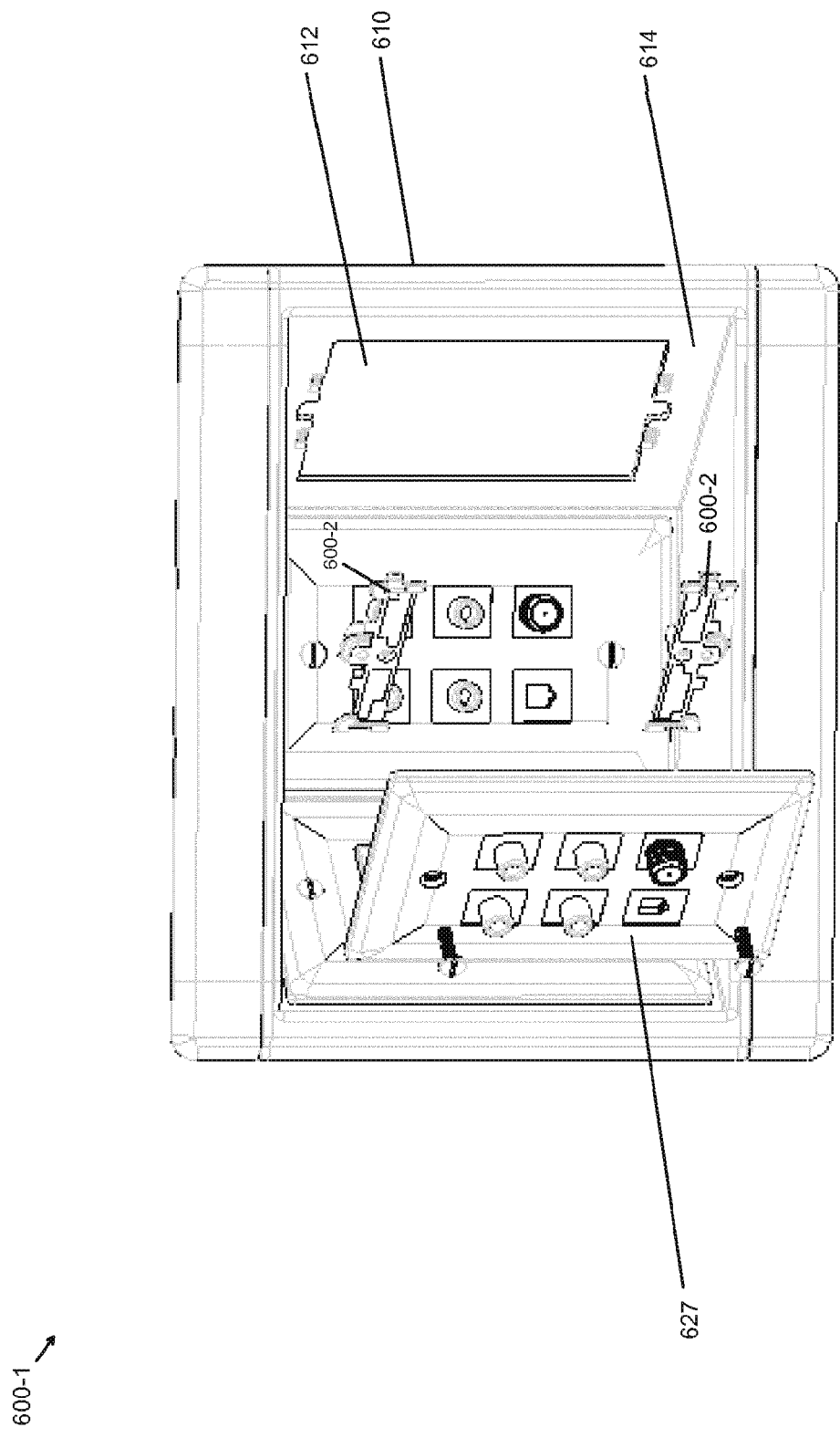
FIG. 6 illustrates a partially-assembled electrical device housing assembly according to an illustrative embodiment of the invention.

According to non-limiting aspects, N may be equal to 1, 2, 3, 4, etc. Another embodiment of the invention is directed to an electrical device housing 600-1 as schematically illustrated in FIG. 6. The assembly includes an electrical device housing 610 which is shown as a 3 gang housing; i.e., the housing can accommodate three single gang (N=1) sized outlet boxes at openings 612. A low voltage device is shown occupying the center sized-opening and a wiring device (partially obscured) is shown occupying the left-side sized-opening. The housing 610 has a plurality of recessed walls 614 (two of which are obscured by the low voltage device and the wiring device), wherein at least one of the walls has an opening (612) that is sized to accommodate a standard N-gang outlet box (in this illustration, N=1). The assembly further includes a pair of removable, uni-body, low voltage device adapter clips 600-2, wherein each clip has a longitudinal body portion having opposite ends defining an N-gang length there between, further having a finger structure that is configured to engage a front and a rear surface of an edge of the sized opening and, further having N device mounting bores disposed between the opposite ends, each of which is aligned with a longitudinal centerline of each one of the N-gang-sized openings, similar to the clip embodiments and aspects 300-1, 500-1 described herein above.

The assembly 600-1 may further include a low voltage device 627 that can be assembled to the housing 610 by screwing the low voltage device into the mounting bores of clips 600-2 after they are finally engaged in the sized opening 612.

As shown in FIG. 6, each of the (identical) clips 600-2 is similar to clip 300-1 in FIG. 3. As such, the finger structure is located at each opposite end and the pair of clips are removeably, slidingly engageable with the front and the rear surface of the opposing edges of the sized opening when the low voltage device is not fixedly assembled to the adapter clips, as illustrated in FIG. 4C. However, once the clips are installed and the low voltage device is assembled to the clips, neither the clips nor the low voltage device are dis-engageable from the housing unless the low voltage device is first disassembled. This advantageously provides a safety feature not provided by the prior art. Further, screws are not needed for preventing the dis-engagement of the clip. Consequently the clips are easy to install and if necessary remove at a later time, since a tool is not required.

Figure 7:
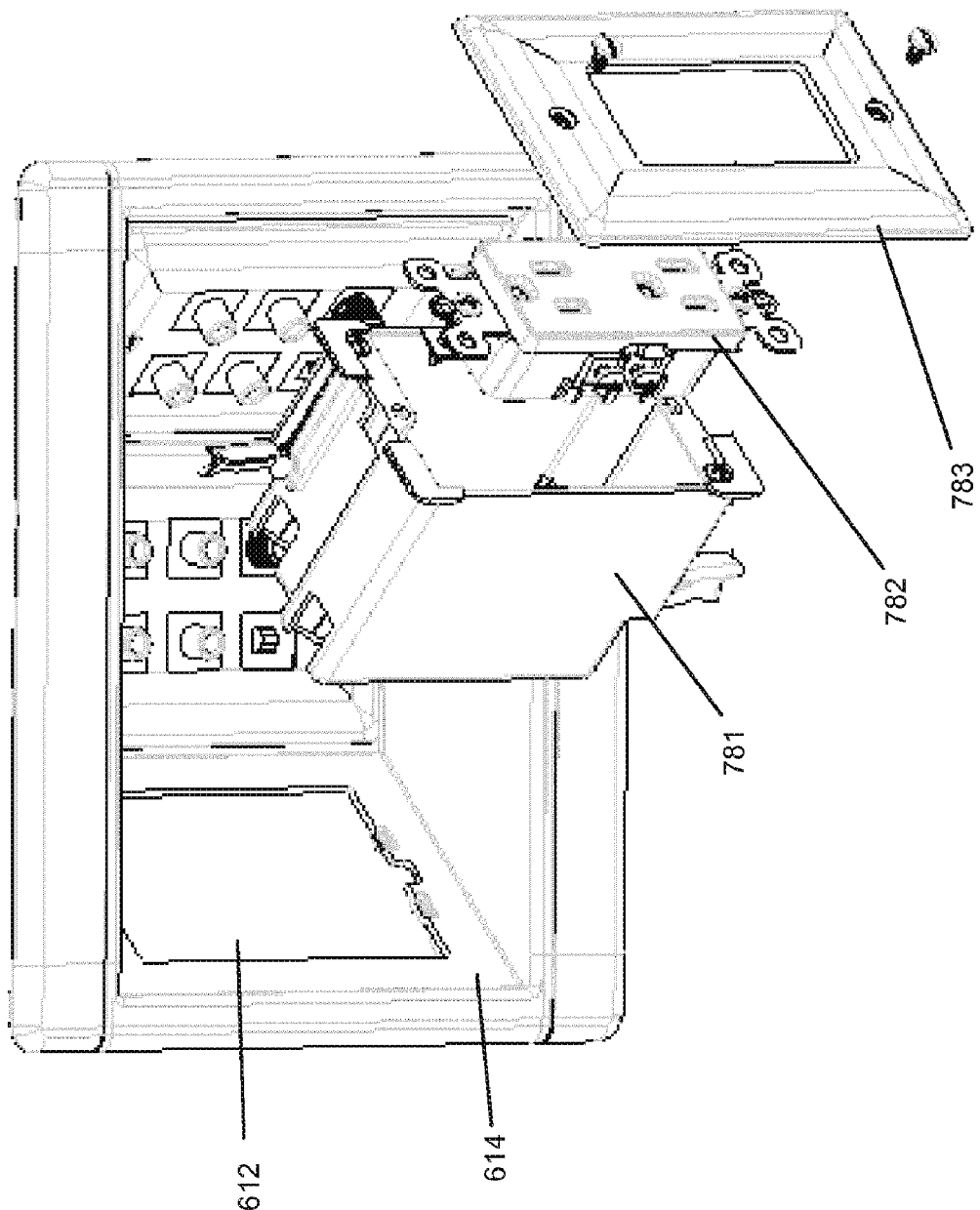
FIG. 7 is a perspective schematic illustration of the box assembly shown in FIG. 6 with a partially disassembled view of a wiring device box, wiring device, and cover plate according to an illustrative embodiment of the invention.

FIG. 7 is a perspective schematic illustration of the box assembly 600-1 shown in FIG. 6 with a partially disassembled view of an outlet 781, a wiring device 782, and a cover plate 783 according to an illustrative embodiment of the invention.

Figure 8A:
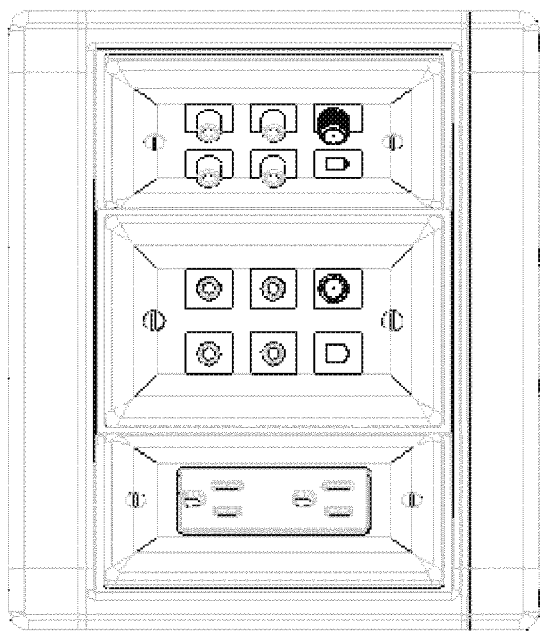
FIG. 8A schematically shows a front elevational view of the box assembly of FIGS. 6 and 7 in a finally assembled condition.
Figure 8B:
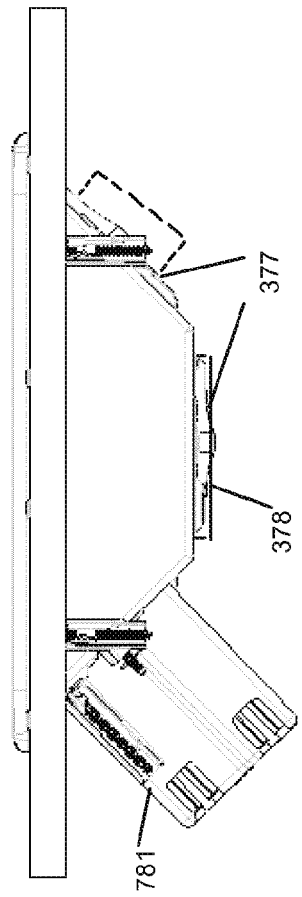
FIG. 8B shows a top plan view of the assembly shown in FIG. 8A, according to an illustrative embodiment of the invention.

FIG. 8A schematically shows a front elevational view of the box assembly 600-1 of FIGS. 6 and 7 in a finally assembled condition. FIG. 8B shows a top plan view of the assembly shown in FIG. 8A, illustrating that the electrical device box 781 protrudes into the wall space behind the wall while only the rear-facing surfaces 377 of the clips and the rear of the low voltage device 378 protrude from the sized-openings occupied by the low voltage devices. The amount of the protrusion is less than that of the low voltage device. Thus the clip can not interfere with the bending radii of cables connected to the low voltage device.

Figure 9A:
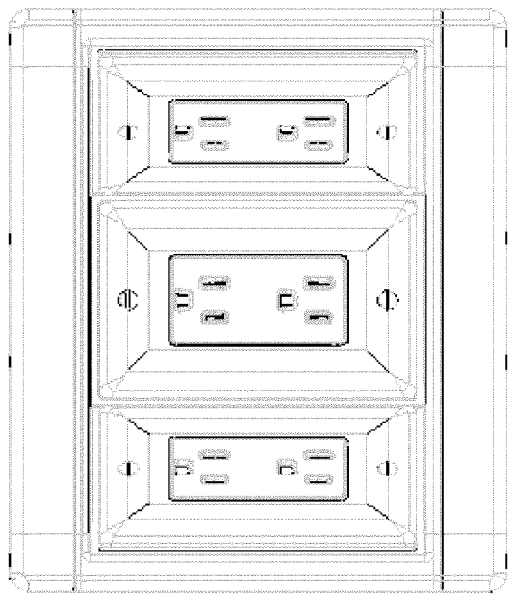
FIGS. 9A, 9B are identical to FIGS. 8A, 8B except that they show three, single-gang wiring devices installed in the assembly, according to an illustrative embodiment of the invention.
Figure 9B:
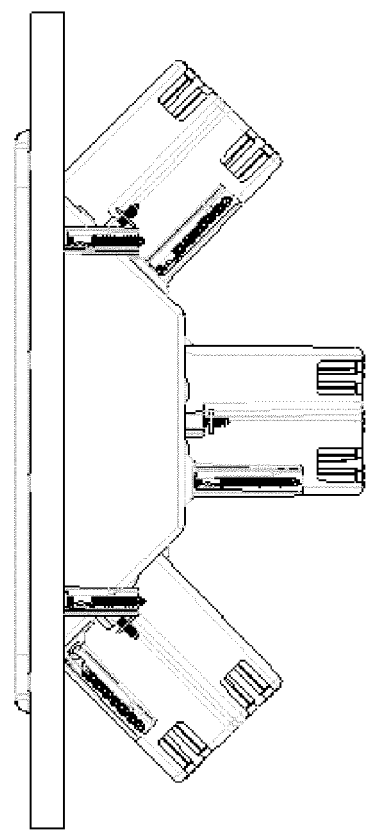
Figure 10A:
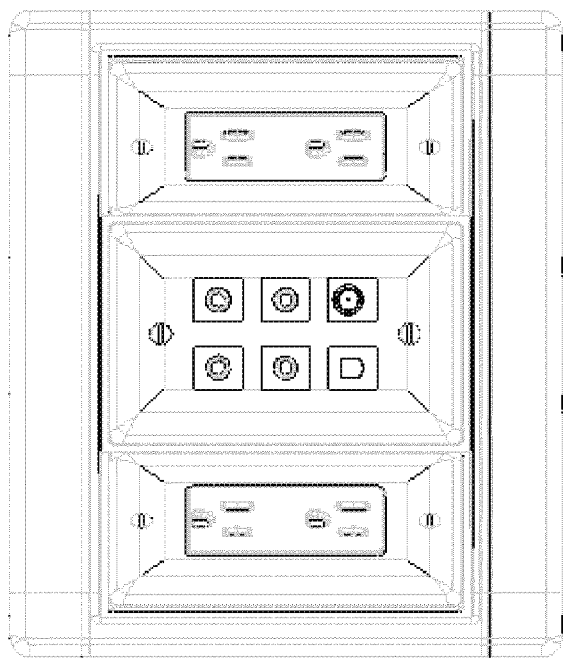
FIGS. 10A, 10B are identical to FIGS. 9A, 9B except that they show two, single-gang wiring devices and one low voltage device installed in the assembly, according to an illustrative embodiment of the invention.
Figure 10B:
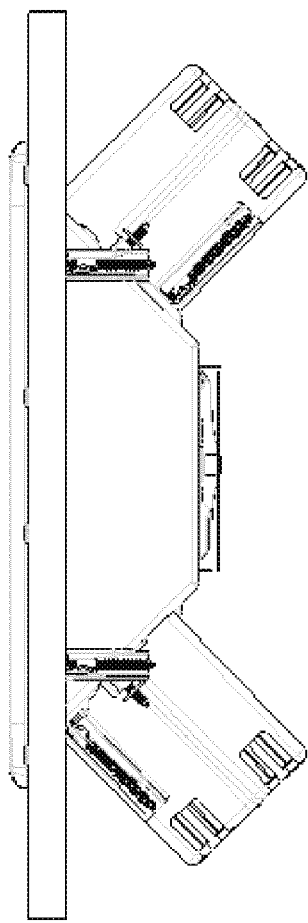
Figure 11A:
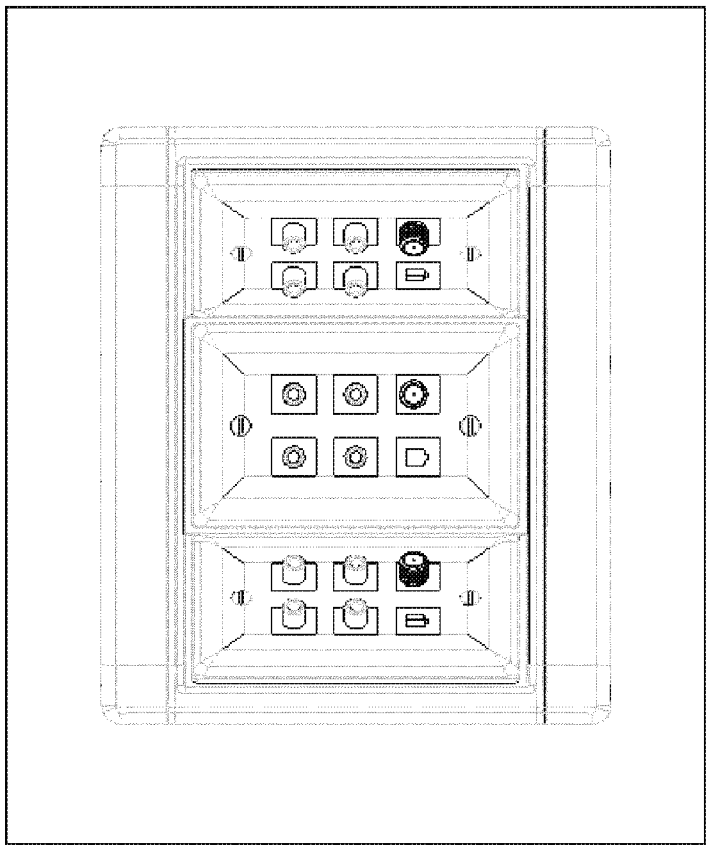
FIGS. 11A, 11B are identical to FIGS. 10A, 10B except that they show three, single-gang low voltage devices installed in the assembly, according to an illustrative embodiment of the invention.
Figure 11B:
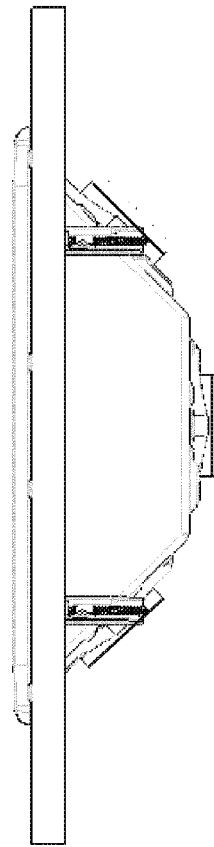

FIGS. 9-11 are similar to FIG. 8, except that they illustrate different combinations of wiring devices and low voltage devices in an electrical device housing assembly according to illustrative aspect of the invention. More particularly, FIGS. 9A, 9B show three, single-gang wiring devices installed in the assembly. Although three decorator-style receptacles are shown, any number of combinations of wiring devices could have been installed. These include duplex receptacles, AFCIs, GFCIs, TVSSs, TVSS receptacles, switches, proximity sensing devices, and the like. FIGS. 10A, 10B show two, single-gang wiring devices and one low voltage device installed in the assembly. FIGS. 11A, 11B show three, single-gang low voltage devices installed in the assembly.

Figure 12A:
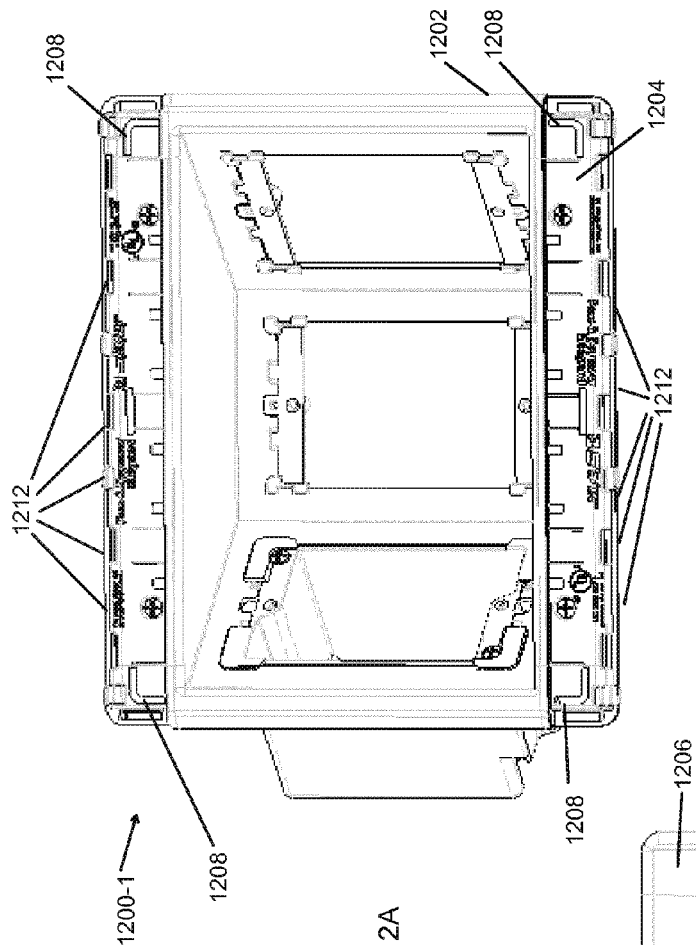
FIGS. 12A, 12B, respectively, show an electrical device housing assembly without and with mounting flange covers according to aspects of the invention.
Figure 12B:
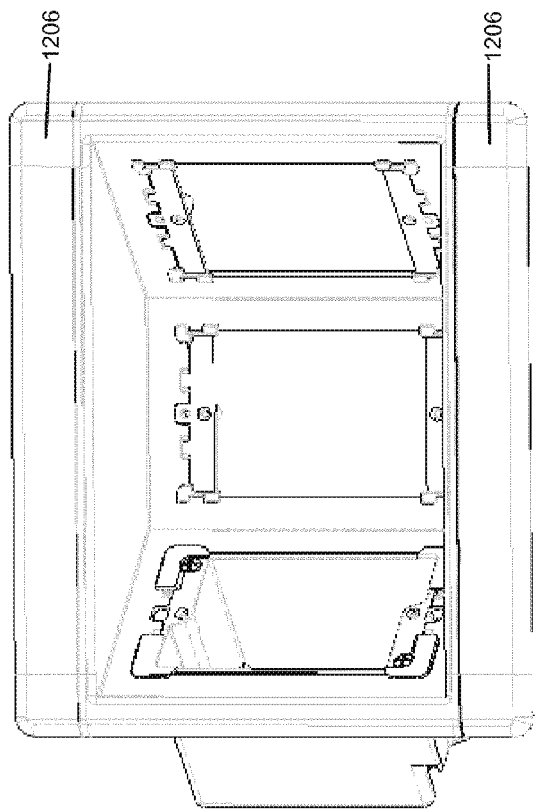

FIGS. 12A, 12B, respectively, show an electrical device housing assembly 1200-1 without and with mounting flange covers 1206, according to aspects of the invention. As shown in FIG. 12A, the electrical device housing 1202 includes a pair of oppositely-disposed mounting flanges 1204 that are integrally connected to the housing. Each mounting flange 1204 has a position-marking opening 1208 therein. As shown, the position marking openings are located in the four corners of the housing flanges; however, they may be positioned in any suitable location.

Each mounting flange 1204 may have a flange cover attachment 1212 adapted to removably retain a flange cover 1206. As shown, the flange cover attachment 1212 include rib and channel structures disposed in the flanges that allow a flange cover to be snap-fitted thereto and provide a finished appearance to the installed electrical device housing assembly. The subject matter of co-pending application U.S. Ser. No. 11/247,896 filed on Oct. 11, 2005 is incorporated herein by reference in its entirety.

According to an aspect, the electrical device housing having only one standard single-gang (N=1) sized-opening has a finished, exterior opening adapted to accommodate a standard two-gang wall plate. According to another aspect, the electrical device housing having three standard single-gang (N=1) sized-openings (as shown, e.g., in FIGS. 6-12) has a finished, exterior opening adapted to accommodate a standard four-gang wall plate.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

I claim:

1. A removable, uni-body, low voltage device adapter clip for an electrical device housing having an opening that is sized to accommodate a standard N-gang outlet box, comprising:
   a longitudinal body portion having opposite ends defining an N-gang length there between, further having a finger structure that is configured to engage a front and a rear surface of an edge of the sized opening and, further having N device mounting bores disposed between the opposite ends, each of which is aligned with a longitudinal centerline of each one of the N-gang-sized openings.

2. The clip of claim 1, wherein the finger structure is located at the opposite ends of the low voltage device adapter clip.

3. The clip of claim 1, wherein the N device mounting bores are threaded.

4. The clip of claim 1, further having N through-openings that each are adjacent to and vertically aligned with a respective device mounting bore.

5. The clip of claim 2, wherein the finger structure is adapted to slidingly engage the front and the rear surface of opposing edges of the sized opening.

6. The clip of claim 1, wherein the body includes a section that is longitudinally compressible to effect engagement with the front and the rear surface of the edge of the sized opening.

7. The clip of claim 1, wherein the body portion includes a device housing-detent-engaging protrusion disposed between the opposite ends.

8. The clip of claim 1, wherein the body portion includes a device housing-protrusion-engaging detent disposed between the opposite ends.

9. The clip of claim 1, wherein the clip has a front face engagement surface that is flat.

10. The clip of claim 1, wherein N is equal to one.

11. The clip of claim 1, wherein N is equal to two.

12. The clip of claim 1, wherein N is equal to or greater than three.

13. An electrical device housing assembly, comprising:
   an electrical device housing having a plurality of recessed walls, wherein at least one of the walls has an opening that is sized to accommodate a standard N-gang outlet box;
   a pair of removable, uni-body, low voltage device adapter clips, each clip comprising:
      a longitudinal body portion having opposite ends defining an N-gang length there between, further having a finger structure that is configured to engage a front and a rear surface of an edge of the sized opening and, further having N device mounting bores disposed between the opposite ends, each of which is aligned with a longitudinal centerline of each one of the N-gang-sized openings.

14. The assembly of claim 13, wherein the finger structure is located at each opposite end.

15. The assembly of claim 13, wherein the N device mounting bores are threaded.

16. The assembly of claim 13, wherein each clip further has N through-openings that each are adjacent to and vertically aligned with a respective device mounting bore.

17. The assembly of claim 14, wherein the finger structure of each clip is adapted to slidingly engage the front and the rear surface of opposing edges of the sized opening.

18. The assembly of claim 13, wherein the body has a section that is longitudinally compressible to effect engagement with the front and the rear surface of the edge of the sized opening.

19. The assembly of claim 13, wherein the at least one of the walls having a sized opening has a detent, further wherein the body portion of the clip includes a detent-engaging protrusion disposed between the opposite ends.

20. The assembly of claim 13, wherein the at least one of the walls having a sized opening has a protrusion, further wherein the body portion of the clip includes a protrusion-engaging detent disposed between the opposite ends.

21. The assembly of claim 13, wherein each clip has a front face engagement surface that is flat.

22. The assembly of claim 13, wherein N is equal to one.

23. The assembly of claim 13, wherein N is equal to two.

24. The assembly of claim 13, wherein N is equal to or greater than three.

25. The assembly of claim 13, further comprising a low voltage device.

26. The assembly of claim 25, wherein the pair of clips are removeably, slidingly engageable with the front and the rear surface of the opposing edges of the sized opening when the low voltage device is not fixedly assembled to the clips and, further wherein neither of the clips are slidingly dis-engageable with the front and the rear surface of the opposing edges of the sized opening when the low voltage device is fixedly assembled to the clips.

27. The assembly of claim 26, wherein the finger structure is located at opposite ends of the clip.

28. The assembly of claim 13, wherein the electrical device housing includes a pair of oppositely-disposed mounting flanges integrally connected to the housing, wherein each mounting flange has a position-marking opening therein.

29. The assembly of claim 13, wherein the electrical device housing includes a pair of oppositely-disposed mounting flanges integrally connected to the housing, wherein each mounting flange has a flange cover attachment adapted to removably retain a flange cover.

30. The assembly of claim 13, wherein the electrical device housing has an exterior N-gang-sized opening.

31. The assembly of claim 13, wherein the electrical device housing has three, single-gang-sized openings, further wherein the electrical device housing has an exterior opening that is sized to accommodate a standard four-gang flange cover.

32. The assembly of claim 25, wherein the low voltage device has a rear surface that protrudes into the sized opening a distance that is equal to or less than a distance that a rear surface of the clip protrudes into the sized opening.

\* \* \* \* \*